United States Patent
Miyazaki

[11] Patent Number: 5,856,850
[45] Date of Patent: Jan. 5, 1999

[54] IMAGE DISPLAY SYSTEM FOR CONVERTING BETWEEN DISPLAY STANDARDS WITH A REDUCED DISTORTION

[75] Inventor: Makoto Miyazaki, Tokyo, Japan

[73] Assignee: NEC Corporation, Tokyo, Japan

[21] Appl. No.: 719,557

[22] Filed: Sep. 25, 1996

[30] Foreign Application Priority Data

Sep. 27, 1995 [JP] Japan .................................. 7-248193

[51] Int. Cl.$^6$ ........................................... H04N 7/01
[52] U.S. Cl. ........................................... 348/441; 348/443
[58] Field of Search .......................... 386/46, 130, 131, 386/128, 441; 348/447, 497, 443

[56] References Cited

U.S. PATENT DOCUMENTS

| | | | |
|---|---|---|---|
| 4,449,143 | 5/1984 | Dischert et al. | 348/441 |
| 4,736,248 | 4/1988 | Rosebrock | 348/441 |
| 4,752,826 | 6/1988 | Barnett | 348/441 |
| 4,870,661 | 9/1989 | Yamada et al. | 348/441 |
| 5,101,273 | 3/1992 | Gillies et al. | 348/441 |
| 5,161,014 | 11/1992 | Pearson et al. | 348/441 |
| 5,166,792 | 11/1992 | Lyon | 348/441 |
| 5,253,041 | 10/1993 | Wine et al. | 358/11 |
| 5,313,281 | 5/1994 | Richards | 348/441 |
| 5,335,074 | 8/1994 | Stec | 348/441 |
| 5,341,172 | 8/1994 | Nio et al. | 348/441 |
| 5,485,216 | 1/1996 | Lee | 348/441 |
| 5,619,270 | 4/1997 | Demmer | 348/441 |

Primary Examiner—Victor R. Kostak
Attorney, Agent, or Firm—Young & Thompson

[57] ABSTRACT

An image display system, in which a display image of a monitor of the first scanning system is taken by a TV camera of the second scanning system to pick up video signals to be displayed on a monitor of the second scanning system. The output of the TV camera of the second scanning system is multiplied by a factor $\alpha$ ($\alpha$ is any real number satisfying $0<\alpha<1$) in a first multiplier. This multiplication result is added together with another input value in an adder. The output of the adder is stored in a frame memory. One frame of video signals read out of the adder is multiplied by another factor $(1-\alpha)$ in the second multiplier. The first and second multiplication results are added together in the adder, and the addition result is returned to the frame memory as feedback. As a result, the video signals output from the TV camera are averaged to prevent an offensive image to the eye of the display.

4 Claims, 4 Drawing Sheets

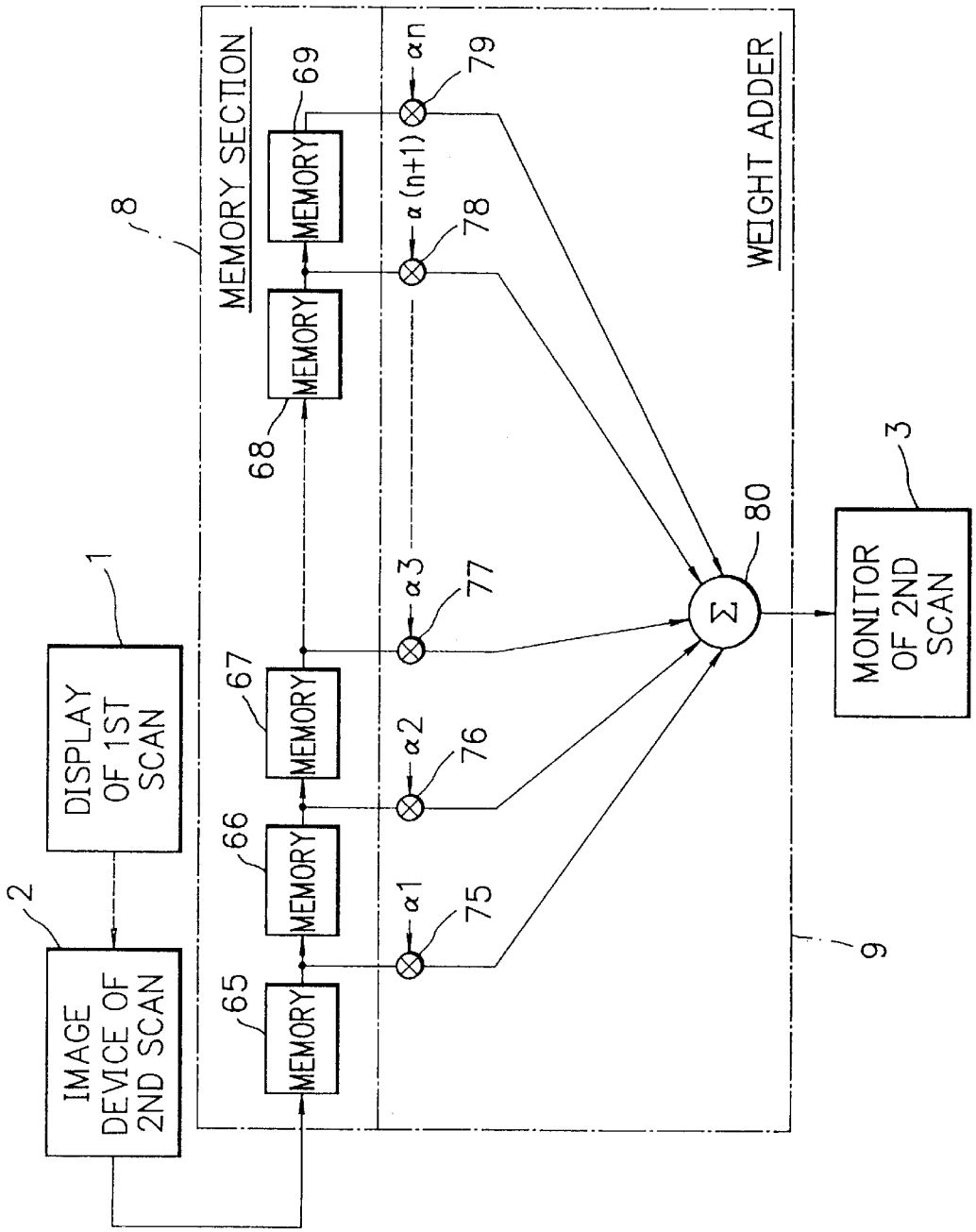

IMAGE DISPLAY SYSTEM FOR CONVERTING BETWEEN DISPLAY STANDARDS WITH A REDUCED DISTORTION

BACKGROUND OF THE INVENTION

The present invention relates to an image display system, and more particularly to an image display system adapted to provide a picture to be displayed on a second display means according to a second scanning system from an image displayed on a first display means using video signals produced by a first scanning system.

DESCRIPTION OF THE PRIOR ART

FIG. 1 shows one conventional image display system. In FIG. 1, a displayed on an image display means 1 such as a monitor of a first scanning system is provided by an imaging device 2 such as a TV camera of a second scanning system different from the first scanning system so as to display the image on a monitor 3 of the second scanning system.

In such a conventional system, even though the scanning systems are different from each other, the image of the first scanning system is directly displayed by an image system of the second scanning system, and a normal image cannot be obtained on the display because of, for example, disturbance such as flicker in the image, which is offensive to a viewer.

This principle will be described as follows. For better understanding, it is assumed that an image is displayed on a monitor of a PAL (Phase Alternation by Line) system in a first scanning system and a PAL picture is provided by a TV camera of an NTSC (National Television System Commitee) system in the second scanning system and is then displayed on a monitor for the NTSC system. Further, it is considered that the picture is imaged so as to be displayed on a full screen of the PAL monitor. In such a system, when a monitor screen of the PAL system is provided by a TV camera of the NTSC system and the obtained image is displayed on an NTSC monitor, an offensive image results.

One cause of the degraded image is that the scanning is carried out every 1/60 second in the NTSC system versus every 1/50 second in the PAL system and the two system are operated on the basis of mutually independent oscillators. Hence, when the screen of the PAL monitor is taken by the NTSC TV camera, a lag inevitably occurs in the scanning timing.

Another cause is an afterimage characteristic of a monitor used or a storage time of a TV camera. As shown in FIG. 2, when an image displayed on a monitor 1 of the first scanning system is taken by a TV camera 2 of the second scanning system, a vertical width of a hatched part 31 in a screen 30 is varied depending on an afterimage time of the image monitor 1 of the first scanning system and a storage time of the TV camera 2 of the second scanning system.

The position of the hatched part 31 displayed on the screen is varied on each occasion by a different scanning speed. This fact will be described in connection with two opposite typical examples. First, when the afterimage of the image monitor 1 of the first scanning system is nearly zero and the storage time of the TV camera 2 of the second scanning system is limited, in practice, no image can be taken. On the other hand, if the afterimage is limited and the storage time is infinite, a perfect screen can be reproduced. However, the afterimage and the storage time are actually limited, and as a result, as shown in FIG. 2, a part of the screen is displayed.

In FIG. 2, numerals 33 and 34 denote vertical blanking signals and a numeral 32 is the displayed part (hatched part) 31 on the image monitor 3 of the second scanning system. A waveform composed of these members 32 to 34 is one example of a video signal, taken along the line A—A of the monitor screen 30.

Referring to FIG. 3, relationship between an afterimage time of a monitor or a storage time of a TV camera and a display screen will be further described in detail. In FIG. 3, a curve 35 represents an afterimage characteristic of the image monitor 1 of the first scanning system, showing an afterimage signal level with respect to time t. A curve 36 represents a storage characteristic of the TV camera 2 of the second scanning system, showing a storage electric charge amount with respect to time t.

An image is displayed on the screen of the monitor 1 of the first scanning system, i.e. one frame of image is displayed on the monitor per one frame scanning. The signal level of the image of the previous frame scanning drops during the present frame scanning according to the characteristic curve 35.

The TV camera 2 of the second scanning system discharges the charge stored in one frame scanning. When the screen of the image monitor 1 of the first scanning system is taken by the TV camera 2, the TV camera 2 picks up the afterimage portion more than a certain signal level (a one-dotted-line 37 in FIG. 3) and stores the charge according to the characteristic curve 36. This stored charge is taken in as an effective video signal.

Hence, actually, the image signal can be captured in a range between the predetermined afterimage level on the screen of the monitor 1 (of at least the one-dotted-line 37) and just before the saturation level of the stored charge of the TV camera 2 (of at most another one-dotted-line 38), as shown in FIG. 3, and this image capturable range is shown by numeral 32.

As described above, the vertical width of the hatched part 31 (captured image region) in FIG. 2 is determined by the width between the two one-dotted-lines 37 and 38 shown in FIG. 3 and is varied depending on the afterimage characteristic 35 of the monitor 1 and the electric charge storage characteristic 36 of the TV camera 2.

When displaying on the monitor 3 of the second scanning system, the position of the hatched part 31 on the screen is changed depending on the timing of the frame scanning, and, since the scanning speed of the two scanning systems are different, the image capturable position is varied depending on the timing of the frame scanning.

As described above, when the output image signals of the TV camera 2 are displayed on the monitor 3, an inaccurate and offensive image is reproduced because of the difference between the scanning speeds of the monitor 1 and the TV camera and the relation between the afterimage characteristic and the electric charge storage time.

SUMMARY OF THE INVENTION

It is therefore an object of the present invention to provide an image display system in view of the aforementioned disadvantages of the prior art, which is capable of attaining an accurate and clear image on a monitor display and preventing an inaccurate and offensive image when scanning systems are different and of preventing occurrences of disturbances in the image.

In accordance with one aspect of the present invention, there is provided an image display system, in which an image on a display produced according to a first scanning system is provided according to a second scanning system to produce an image on a display of the second scanning system, comprising first multiplying means for multiplying the video signals taken according to the second scanning system and a predetermined factor $\alpha$ ($\alpha$ is any real number satisfying $0<\alpha<1$) together to output a first multiplication result; adder means for adding the first multiplication result and a second multiplication result to output an addition result; frame memory means for storing one frame of video signals output from the adder means; and second multiplying means for multiplying one frame of the video signals read out of the frame memory means and a factor $(1-\alpha)$ together to output the second multiplication result, the output of the adder means being displayed on the image display of the second scanning system.

In accordance with another aspect of the present invention, there is provided an image display system, in which on image on a display system for displaying image signals produced according to a first scanning system is provided according to a second scanning system to produce an image on a display of the second scanning system, comprising memory means for storing a plurality of frames of video signals taken according to the second scanning system; and weighting addition means for multiplying the plurality of frames of video signals read out of the memory means and respective weight factors together and summing up the plurality of frames of the weighted video signals, the output of the weighting addition means being displayed on the image display of the second scanning system.

Preferably, the memory means is capable of storing n (n is an integer of 2 and more) frames of video signals, or the weight factors of the weighting addition means are $\alpha i$ (i=1 to n corresponding to 1 to n frames) and a sum of all $\alpha i$ is one.

In an image display means, the memory means includes n one-frame memories connected in series, and the weighting addition means includes n multipliers for multiplying the outputs of the n one-frame memories and respective weight factors $\alpha i$ and an adder for summing up the outputs of the n multipliers.

According to the present invention, an image displayed on a monitor using the first scanning system is taken by an imaging device of the second scanning system, and one frame of the video signals taken is stored in a frame memory. The output of the imaging device of the second scanning system is multiplied by a factor $\alpha$ ($\alpha$ is any real number satisfying $0<\alpha<1$) and the output of the frame memory is multiplied by another factor $(1-\alpha)$. These two multiplication results are summed up in an adder, and the output of the adder is stored in the frame memory. As a result, disturbances in the image, which are caused by directly displaying the video signals taken by the imaging device of the second scanning system, can be removed.

Further, a display image of a monitor of the first scanning system is taken by an imaging device of the second scanning system, and a plurality of frames of video signals are stored in a memory means. The plurality of frames of video signals are multiplied by respective weight factors, and the plurality of frames of the weighted video signals are summed up to output the average video signals to be displayed on the monitor. As a result, the disturbances in the image, which are caused by directly displaying the video signals taken by the imaging device of the second scanning system, can be removed.

BRIEF DESCRIPTION OF THE DRAWINGS

The objects, features and advantages of the present invention will become more apparent from the consideration of the following detailed description, taken in conjunction with the accompanying drawings, in which:

FIG. 6 is a block diagram of an image display system according to another embodiment of the present invention.

DESCRIPTION OF THE PREFERRED EMBODIMENTS

Figure 1:
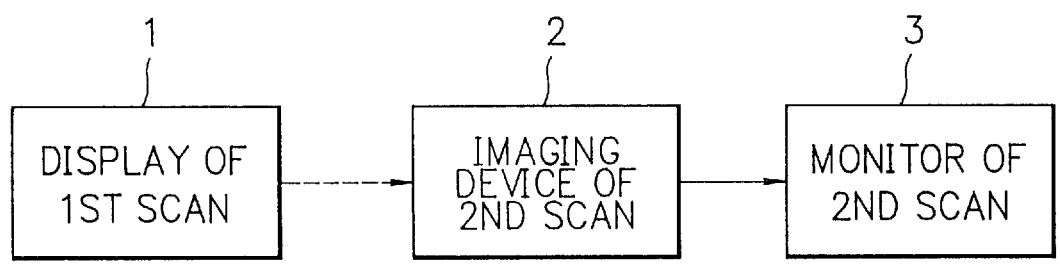
FIG. 1 is a block diagram of a conventional image display system.
Figure 2:
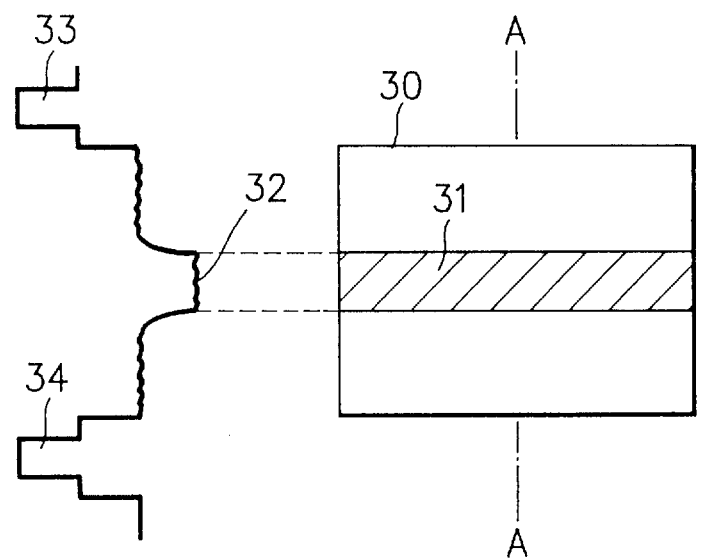
FIG. 2 is a schematic diagram showing an operation of the image display system shown in FIG. 1.
Figure 3:
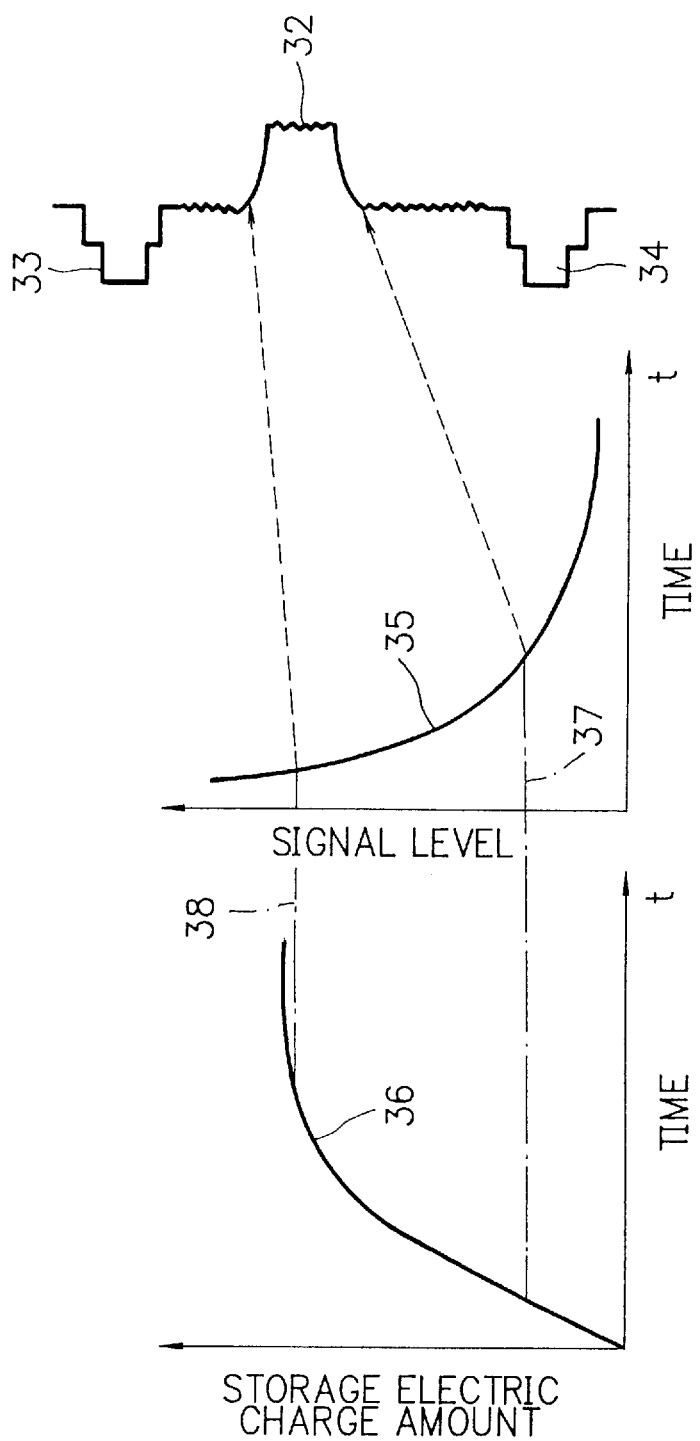
FIG. 3 is a schematic diagram showing the relationship between an afterimage characteristic of a monitor or a storage characteristic of a TV camera and a screen image displayed in the image display system shown in FIG. 1.
Figure 4:
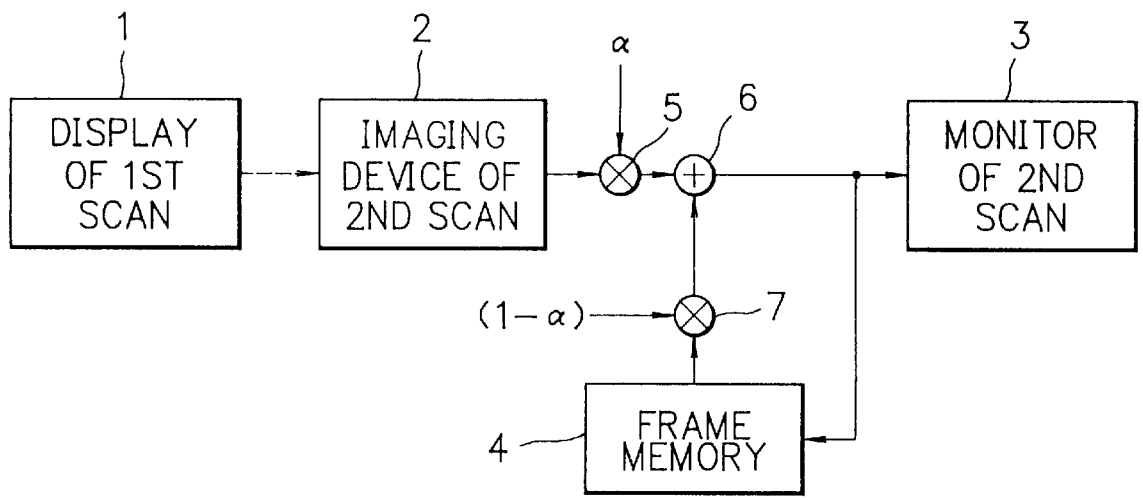
FIG. 4 is a block diagram of an image display system according to one embodiment of the present invention.

Referring now to the drawings, wherein the same reference characters designate the same members throughout the several views, there is shown in FIG. 4 an image display system according to a first embodiment of the present invention.

In FIG. 4, an image is displayed on an image display means 1 such as a monitor of the first scanning system, and the display of the monitor 1 is imaged by an imaging device 2 such as a TV camera of the second scanning system.

The image signal picked up by the TV camera 2 is multiplied by a factor $\alpha$ in a multiplier 5. This factor $\alpha$ is any real number satisfying $0<\alpha<1$. A multiplied output of the multiplier 5 is fed to an adder 6 so as to be added together with another input value in the adder 6. This addition result is stored in a frame memory 4.

This frame memory 4 stores video signals for one frame, and one frame of video signals are read out of the frame memory 4 and are input to a multiplier 7. The multiplier 7 multiplies one frame of video signals by a factor $(1-\alpha)$, and the multiplication result is input to the adder 6 as another input value. The addition result of the adder 6 is displayed on a monitor 3 of the second scanning system.

Figure 5:
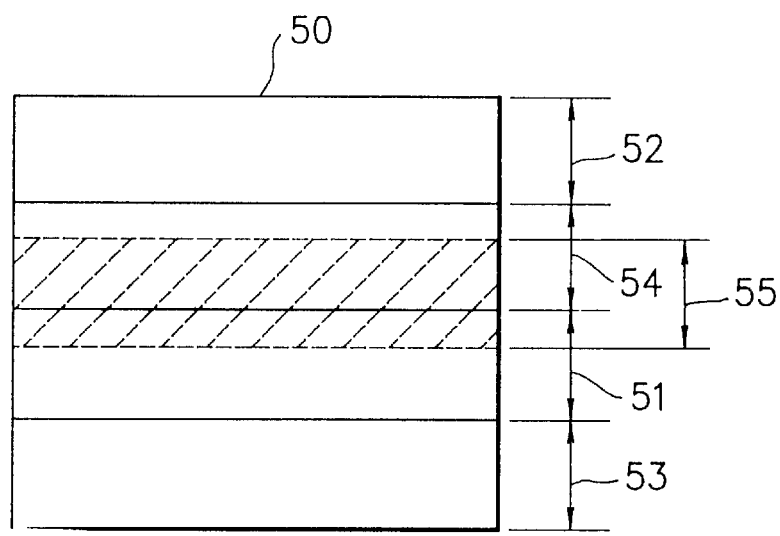
FIG. 5 is a schematic diagram shown an operation of the image display system shown in FIG. 4.

An operation of the image display system described above with reference to FIG. 4 will now be described in connection with FIG. 5. FIG. 5 shows a display screen 50 of the monitor 3 of the second scanning system, and one frame of video signals are all captured by four frame scannings.

In the first frame scanning, a partial image 51 captured is multiplied by the factor $\alpha$ in the multiplier 5, and this multiplication result is input to the frame memory 4 via the adder 6. One frame of video signals read out of the frame memory 4 are multiplied by the factor $(1-\alpha)$ in the multiplier 7, and this multiplication result is input to the adder 6. In the adder 6, this multiplication result of the multiplier 7 is multiplied by the multiplication result of the multiplier 5, which are $\alpha$ times of video signals (partial image 52) taken by the next frame scanning. This addition result, i.e. one frame of video signals are returned to the frame memory 4. In this embodiment, a part of the video signals is feedback.

In the second frame scanning, the partial image 52 taken is multiplied by the factor a in the multiplier 5. One frame of video signals read out of the frame memory 4, including the video signals taken by the first frame scanning is multiplied by the factor $(1-\alpha)$ in the multiplier 7. This multiplication result of the multiplier 7 is added together with the multiplication result (including a partial image 53)

of the multiplier 5 in the adder 6. This addition result, i.e. one frame of video signals are returned to the frame memory 4.

In the third frame scanning, the partial image 53 taken is multiplied by the factor a in the multiplier 5. One frame of video signals read out of the frame memory 4, including the video signals taken by up to the previous frame scanning is multiplied by the factor $(1-\alpha)$ in the multiplier 7. This multiplication result of the multiplier 7 is added together with the multiplication result (including a partial image 54) of the multiplier 5 in the adder 6. This addition result, i.e. one frame of video signals are returned to the frame memory 4.

In the fourth frame scanning, the partial image 54 taken is multiplied by the factor $\alpha$ in the multiplier 5. One frame of video signals read out of the frame memory 4, including the video signals taken by up to the previous frame scanning is multiplied by the factor $(1-\alpha)$ in the multiplier 7. This multiplication result of the multiplier 7 is added together with the multiplication result (including a partial image 55) of the multiplier 5 in the adder 6. This addition result, i.e. one frame of video signals are returned to the frame memory 4.

As described above, in this embodiment, one frame of video signals are all taken by the four frame scannings and are stored in the frame memory 4. When one frame of video signals output from the adder 6 are displayed on the image monitor 3, disturbances in the image such as an inaccurate and offensive image can be reduced to display an accurate and clear image on the monitor.

Thereafter, in the fifth frame scanning, the partial image 55 taken is multiplied by the factor $\alpha$ in the multiplier 5. One frame of video signals read out of the frame memory 4, including the video signals taken by up to the previous frame scanning is multiplied by the factor $(1-\alpha)$ in the multiplier 7. This multiplication result of the multiplier 7 is added together with the multiplication result of the multiplier 5 in the adder 6 in the same manner as described above. This addition result, i.e. one frame of video signals are returned to the frame memory 4.

After the fifth frame scanning, one frame of video signals are produced so that the image captured by up to the present (e.g. fifth) frame scanning may be overwritten on the image taken by up to the previous (e.g. fourth) frame scanning, and are returned to the frame memory 4. When the image signals of which a part (partial image) is feedback are displayed on the monitor, a partial image taken every frame scanning is always overwritten onto one frame of video signals so as to update one frame video signals, and the update video signals are reproduced to display the image on the monitor.

The factor $\alpha$ is determined depending on the afterimage characteristic of the image monitor 1 of the first scanning system, the electric charge storage characteristic of the TV camera 2 of the second scanning system, and the first and second scanning systems. Now, assuming that $\alpha=0.3$, an image display system will be described.

In the first frame scanning, the video signals taken are multiplied by $\alpha=0.3$ in the multiplier 5, and the video signals×0.3 are stored in the frame memory 4.

In the second frame scanning, the video signals captured are multiplied by $\alpha=0.3$ in the multiplier 5, and the video signals stored in the frame memory 4 in the previous frame scanning are multiplied by $(1-\alpha)=1-0.3=0.7$ in the multiplier 7. Since the video signals read out of the frame memory 4 are multiplied by 0.7, in fact, the video signals are multiplied by 0.3×0.7=0.21. Hence, the video signals×0.21 are then added together with the video signals×0.3 in the adder 6, and the video signals×(0.3+0.21=0.51) are stored in the frame memory 4.

In the third frame scanning, similarly, the video signals taken are multiplied by 0.3 in the multiplier 5, and the video signals read out of the frame memory 4 are multiplied by 0.7 in the multiplier 7, and these two multiplication results are added together in the adder 6. Hence, the video signals× (0.3+0.51×0.7=0.657) are stored in the frame memory 4.

In the fourth frame scanning, similarly, $\alpha$ and $(1-\alpha)$ are multiplied by the respective video signals and the two multiplication results are added together in the adder 6. That is, the video signals×(0.3+0.657×0.7=0.7599) are stored in the frame memory 4.

In the fifth frame scanning on, similarly, $\alpha$ and $(1-\alpha)$ are multiplied by the respective video signals, and the two multiplication results are added together in the adder 6. The video signals output from the adder 6 are stored in the frame memory 4.

By repeating this operation, the video signals to be stored in the frame memory 4 becomes one (one frame), and thereafter the captured partial image multiplied by $\alpha$ is updated. Hence, in the first frame scanning, the taken partial image multiplied by $\alpha$ is output. By repeating the feedback of the partial image to the video signals to be stored in the frame memory 4, the rate of the updated video signals increases. Finally, the partial image taken in each frame scanning, multiplied by $\alpha$ is updated to output one frame of video signals.

In the manner described above, in this embodiment, the disturbances in the image can be reduced, compared with the conventional system in which the captured video signals are directly output.

FIG. 6 shows an image display system according to a second embodiment of the present invention. In FIG. 6, the same members as those shown in FIG. 4 are designated by the same numerals and the detailed description thereof can be omitted for brevity.

In this embodiment, a display screen of an image monitor 1 of the first scanning system is taken by a TV camera 2 of the second scanning system, and the captured video signals are stored in a memory section 8 capable of storing n (n is an integer of 2 and more) frames of video signals.

The memory section 8 includes n one-frame memories 65 to 69 connected to each other in series. A weight adder 9 includes n multipliers 75 to 79 for multiplying respective weight factors and the outputs of the respective one-frame memories 65 to 69 of the memory section 8, and an adder 80 for summing up all the video signals weighted by the respective multipliers 75 to 79. The addition result of the adder 80 is reproduced to display an image on an image monitor 3 of the second scanning system.

One frame of the video signals are stored in the first memory 65 every time when the TV camera 2 of the second scanning system performs one frame scanning to pick up the video signals. At this time, the video signals stored in the first memory 65 in the previous frame scanning are transferred to the second memory 66 of the next stage and are output to the first multiplier 75.

Similarly, the video signals stored in the second memory 66 are transferred to the third memory 67 of the next stage and are output to the second multiplier 76. The other memories operate similarly, but the n-th memory 69 only outputs the stored video signals to the n-th multiplier 79.

In this manner, each of the memories 65 to 69 transfers the stored video signals to the memory of the next stage and also outputs the video signals to the multiplier.

The multipliers 75 to 79 each multiply the respective weight factors α1 to αn and the outputs of the memories 65 to 69 together and output the respective multiplication results to the adder 80. The adder 80 sums up all the multiplication results of the multipliers 75 to 79 to output the addition result to the image monitor 3 of the second scanning system.

In this embodiment, the weight factors α1 to αn of the multipliers 75 to 79 are selected so as to satisfy the following formula.

$$\Sigma \alpha i = 1$$

Further, it is assumed that Σ is the sum of i=1 to n. Hence, the video signals output from the adder 80 becomes one, and one frame of video signals are output every frame scanning. The video signals output from the adder 80 are an average value of the n frames of video signals stored in the memories 65 to 69. That is, the adder 80 sums up the outputs of the multipliers 75 to 79, i.e. one frames of video signals output from the memories 65 to 69, multiplied by the respective weight factors α1 to αn, and outputs the addition result.

In this embodiment, one frame of the average video signals of the n frames of video signals are displayed on the monitor, compared with the conventional system in which the captured video signals are directly displayed, and hence the disturbances in the image can be reduced.

As described above, according to the present invention, even when the display screen of the monitor of the first scanning system is taken by the TV camera of the second scanning system, the disturbances in the image can be reduced by a extremely simple construction of an image display system, particularly, optimum for a video signal display of still images.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image display system, in which a display image of an image display of a first scanning system for displaying image signals produced according to the first scanning system is imaged according to a second scanning system to display an image on an image display of the second scanning system, comprising:

first multiplying means for producing a first multiplication result by multiplying the video signals from a sample most recently taken according to the second scanning system by a predetermined factor α (α is any real number satisfying 0<α<1);

adder means for producing an output by adding a second multiplication result based on an immediately preceding sample to the first multiplication result;

frame memory means for storing the output from the adder means while a successive sample of the video signals is taken according to the second scanning system; and second multiplying means for producing the second multiplication result by multiplying contents of the frame memory means by a factor (1−α), the output of the adder means being displayed on the image display of the second scanning system.

2. An image display system, in which a display image of an image display of a first scanning system for displaying image signals produced according to the first scanning system is imaged according to a second scanning system to display an image on an image display of the second scanning system, comprising:

memory means for storing a plurality of frames of video signals taken according to the second scanning system; and weighting addition means for multiplying the plurality of frames of video signals read out of the memory means and respective weight factors together and summing up the plurality of frames of the weighted video signals, the output of the weighting addition means being displayed on the image display of the second scanning system;

wherein the memory means is capable of storing n (n is an integer of 2 and more) frames of video signals, and the weight factors of the weighting addition means are $\alpha i$ (i=1 to n corresponding to 1 to n frames) and a sum of all $\alpha i$ is one.

3. An image display means of claim 2, wherein the memory means includes n one-frame memories connected in series, and the weighting addition means includes n multipliers for multiplying the outputs of the n one-frame memories and respective weight factors $\alpha i$ and an adder for summing up the outputs of the n multipliers.

4. The image display system of claim 1, wherein the output from the adder means represents the summation of $F_x \alpha (1-\alpha)^{(n-x)}$ for x=0 to n, where $F_x$ is one of the sampled video signals and n is a positive integer.

* * * * *